No. 687,616. Patented Nov. 26, 1901.
A. DUPPLER.
ELECTROMAGNET AND BRAKE OPERATING CONNECTION.
(Application filed Apr. 30, 1901.)
(No Model.)
Fig. 1.
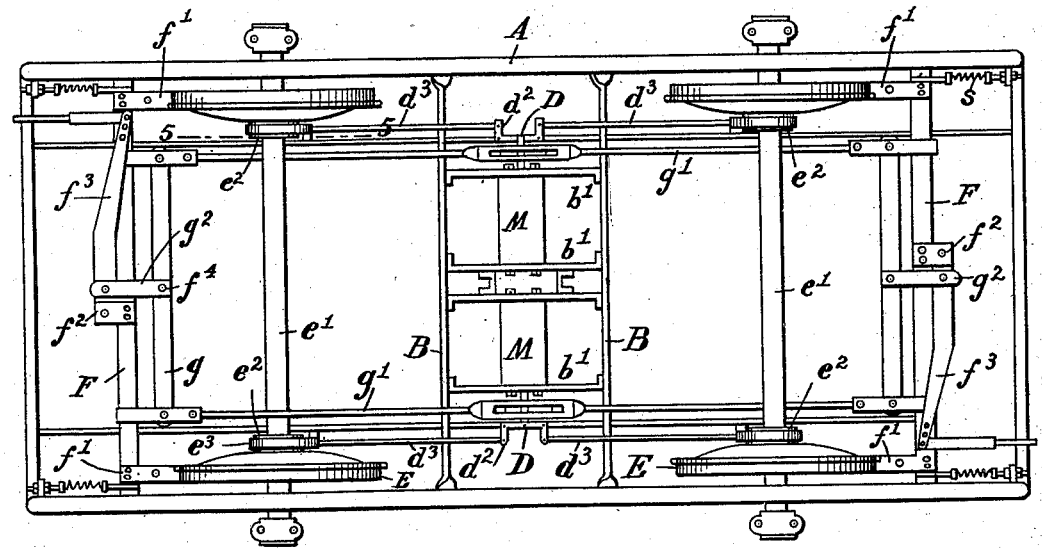
Fig. 2.
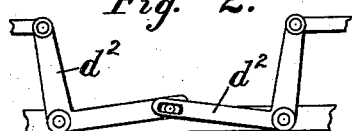
Fig. 3.
Fig. 4.
Fig. 5.
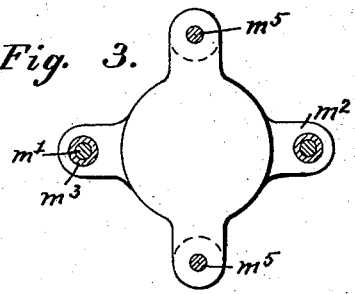
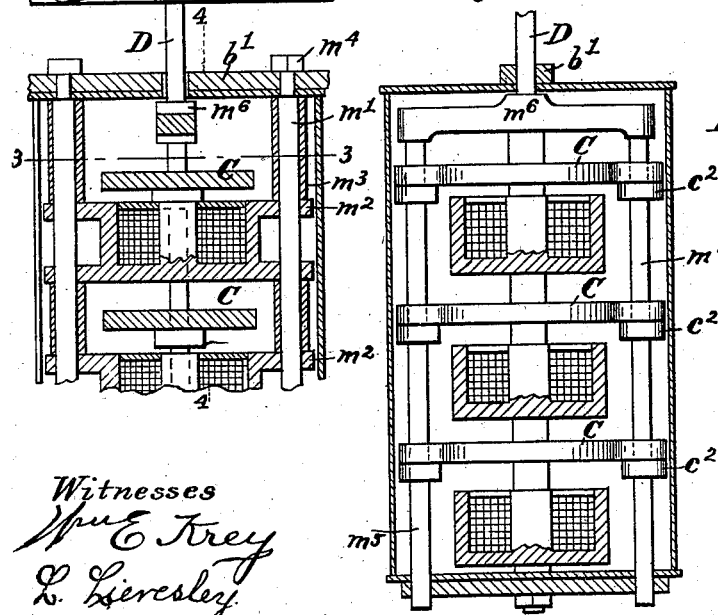
Witnesses
Wm E Krey
L. Sieresley
Inventor
Anton Duppler

UNITED STATES PATENT OFFICE.

ANTON DUPPLER, OF JERSEY CITY, NEW JERSEY, ASSIGNOR TO COMPOUND MAGNET BRAKE COMPANY, OF NEW JERSEY, A CORPORATION OF NEW JERSEY.

ELECTROMAGNET AND BRAKE-OPERATING CONNECTION.

SPECIFICATION forming part of Letters Patent No. 687,616, dated November 26, 1901.

Application filed April 30, 1901. Serial No. 58,176. (No model.)

*To all whom it may concern:*

Be it known that I, ANTON DUPPLER, a citizen of the United States, residing at Jersey City, in the county of Hudson and State of New Jersey, have invented a new and useful Improvement in Electromagnets and Brake-Operating Connections, of which the following is a full description.

The accompanying drawings illustrate the invention, of which—

Figure 1 is a top or plan view of a car-body, showing magnets, brakes, and their respective connections; Fig. 2, a sectional view of part of the magnet, the bars or rods to which they are secured, and showing the armature-rod and its connections with the bell-crank for working the brakes; Fig. 3, a top view of the compound magnet taken on line 3 3 of Fig. 2; Fig. 4, a sectional view of the magnet, taken on line 4 4, Fig. 2; Fig. 5, an enlarged view of collar on wheel and brake-band adjusted thereto, taken on line 5 5 of Fig. 1.

Similar letters refer to similar parts throughout the several views.

A is the framework of a car or other vehicle to which is secured the bars B, which are connected together by the cross-pieces $b'$. Upon these pieces are seated the electromagnets M. The construction of these magnets is illustrated in Figs. 2 and 4. Two rods or bars $m'$ pass through the cross-pieces $b'$ and also through the extensions $m^2$ at the top and base of the magnets, of which there may be any number more than two. The hollow tubes $m^3$ are prepared at proper lengths and serve to adjust the magnets at the required distances apart, and the whole are secured by the nuts $m^4$. At the opposite sides are two other rods $m^5$, Fig. 4, joined by the cross-head $m^6$, and when thus joined form a reciprocating frame actuated by the armatures C. Securely attached to the rods $m^5$ are the washers $c^2$, by means of which the armatures are adjusted at their respective distances from the poles of their magnets. Extending beyond the cross-head is the connecting-rod D, to which may be attached the devices to be actuated by the magnet. The armatures when properly adjusted to their places are arranged at different distances from the poles of their magnets and reach them at different times. As illustrated in the drawings, the armature of the upper magnet is closer to its pole than that of the second and the second closer than the third, and so on. Thus they all pull together at first, and as the closer ones reach their poles they bring the others into the field until the last one reaches home. Thus we have a long-pull magnet of great power and one which may be practically used for operating brakes.

Pivoted to a suitable part of the frame are the bell-crank levers $d^2$, one of the arms of which is connected with the armature-rod D and the other with the connecting-rods $d^3$.

E represents the wheels, and $e'$ the axles. On the side of the wheel is placed or turned a shoulder $e^2$ and around this shoulder the band-brake $e^3$, Fig. 5. One end of this band-brake is secured to a suitable part of the frame and the other connected with the bell-crank lever $d^2$ by means of the rod $d^3$.

It will be seen that the arrangement as above described enables the driver of a car or vehicle to use this braking device as supplementary to the main braking device operated by hand. This main device consists of the cross-bars F, suspended from the body of the car and carrying the brake-shoes $f'$. A projection from the cross-piece $f^2$ serves to pivot the lever $f^3$, which is connected to the lever adapted to be grasped by the hand of the operator of the car or vehicle. A frame composed of the cross-pieces $g$ and the connecting-bars $g'$ is laid upon and supported by the cross-pieces F. The cross-piece $g$ and lever $f^3$ are joined by the link $g^2$. The operation of the lever $f^3$ actuates the brake-shoes $f'$, draws them in contact with the rims of the wheels, and the springs $s$ return the parts to normal position. There is thus a double brake arrangement, one operating on the rim of the wheel operated by hand and the other on a collar actuated by the long-pull electromagnet above described.

What I claim, and desire to secure by Letters Patent, is—

A long-pull combination electromagnet consisting of a series of electromagnets rigidly secured to the rods $m'$, a movable frame composed of the rods $m^5$ joined by the cross-head $m^6$ and carrying the connecting-rod D, the washers $c^2$ secured to the rods $m^5$, and the armatures C loosely mounted on the rods and seated on the washers and arranged at different distances from the poles of their respective magnets, in combination with the band-brakes $e^3$ seated on the shoulder $e^2$ of the wheels, the bell-crank lever $d^2$, suitably pivoted to the frame, and connected by the rod $d^3$ to the band-brake and by the other arm of the lever to the connecting-rod D substantially as described.

ANTON DUPPLER.

Witnesses:
 WM. E. KREY,
 L. LÜRESLEY.